(12) United States Patent
Czaplicki

(10) Patent No.: US 9,382,460 B2
(45) Date of Patent: Jul. 5, 2016

(54) STRUCTURAL ADHESIVES

(71) Applicant: Zephyros, Inc., Romeo, MI (US)

(72) Inventor: Michael Czaplicki, Rochester, MI (US)

(73) Assignee: Zephyros, Inc., Romeo, MI (US)

(*) Notice: Subject to any disclaimer, the term of this patent is extended or adjusted under 35 U.S.C. 154(b) by 0 days.

(21) Appl. No.: 14/753,108

(22) Filed: Jun. 29, 2015

(65) Prior Publication Data

US 2015/0299537 A1 Oct. 22, 2015

Related U.S. Application Data

(63) Continuation of application No. 13/696,691, filed as application No. PCT/EP2011/002293 on May 9, 2011, now Pat. No. 9,157,013.

(30) Foreign Application Priority Data

May 10, 2010 (GB) .................................. 1007793.1

(51) Int. Cl.
| | | |
|---|---|---|
| *C09J 163/02* | (2006.01) | |
| *B29C 65/52* | (2006.01) | |
| *C09J 121/00* | (2006.01) | |
| *C09J 163/00* | (2006.01) | |
| *C08G 59/40* | (2006.01) | |
| *C09J 5/06* | (2006.01) | |
| *C09J 171/00* | (2006.01) | |
| *B29C 65/48* | (2006.01) | |

(52) U.S. Cl.
CPC ........... *C09J 163/00* (2013.01); *B29C 65/4835* (2013.01); *C08G 59/4021* (2013.01); *C09J 5/06* (2013.01); *C09J 171/00* (2013.01); *C08G 2650/56* (2013.01); *C09J 2400/163* (2013.01)

(58) Field of Classification Search
CPC ........ B29C 65/62; C09J 163/02; C09J 121/00
USPC ...................................................... 156/330
See application file for complete search history.

(56) References Cited

U.S. PATENT DOCUMENTS

| | | | |
|---|---|---|---|
| 3,873,637 A | 3/1975 | Fujiwara et al. | |
| 3,944,631 A | 3/1976 | Yu et al. | |
| 3,984,497 A | 10/1976 | Owens et al. | |
| 3,985,703 A | 10/1976 | Ferry et al. | |
| 4,034,013 A | 7/1977 | Lane | |
| 4,096,202 A | 6/1978 | Farnham et al. | |
| 4,304,709 A | 12/1981 | Salee | |
| 4,306,040 A | 12/1981 | Baer | |
| 4,495,324 A | 1/1985 | Chacko et al. | |
| 4,536,436 A | 8/1985 | Maeoka et al. | |
| 5,275,853 A | 1/1994 | Silvis et al. | |
| 5,290,857 A | 3/1994 | Ashida et al. | |
| 5,464,924 A | 11/1995 | Silvis et al. | |
| 5,962,093 A | 10/1999 | White et al. | |
| 6,111,015 A | 8/2000 | Eldin et al. | |
| 2002/0182955 A1 | 12/2002 | Weglewski et al. | |
| 2003/0144416 A1 | 7/2003 | Tarbutton et al. | |
| 2004/0191523 A1 | 9/2004 | Kye | |
| 2004/0204551 A1 | 10/2004 | Czaplicki et al. | |
| 2004/0221953 A1 | 11/2004 | Czaplicki et al. | |
| 2004/0266899 A1 | 12/2004 | Muenz et al. | |
| 2007/0088138 A1 | 4/2007 | Czaplicki et al. | |
| 2007/0284036 A1 | 12/2007 | Sheasley et al. | |
| 2008/0014053 A1 | 1/2008 | Healy | |
| 2008/0060742 A1 | 3/2008 | Sheasley et al. | |
| 2008/0308212 A1 | 12/2008 | Sheasley et al. | |

FOREIGN PATENT DOCUMENTS

| | | | |
|---|---|---|---|
| WO | 2008/0014053 A2 | 1/2008 | |
| WO | 2008/157129 A1 | 12/2008 | |
| WO | 2009/0124709 A1 | 10/2009 | |
| WO | 2010/000371 A1 | 1/2010 | |

OTHER PUBLICATIONS

Copending U.S. Appl. No. 12/936,777, filed Dec. 3, 2010 Publication No. 11-0098382.
Copending U.S. Appl. No. 12/136,333, Filed Jun. 10, 2008, Publication No. 08-0308212, U.S. Pat. No. 8,702,889.
International Preliminary Report on Patentability dated Nov. 22, 2012 for PCT/EP2011/002293.
International Search Report & Written Opinion dated Jun. 6, 2012 for PCT/EP2011/002293.
UK Search Report dated May 6, 2011 for Application No. GB1007793.1.
Chinese Office Action dated Jan. 12, 2015; Application No. 201180029998.2.
Chinese Office Action for Chinese application No. 201180029998.2 dated Sep. 15, 2015.

*Primary Examiner* — Daniel Lee
(74) *Attorney, Agent, or Firm* — The Dobrusin Law Firm, P.C.

(57) ABSTRACT

A solid dry to the touch at ambient temperature structural adhesive which can be cured at elevated temperature and which can be molded at an intermediate temperature is provided as well as the use of the adhesive for bonding metals.

20 Claims, No Drawings

STRUCTURAL ADHESIVES

The present invention relates to improvements in or relating to activatable structural adhesives and in particular to structural adhesives that are used for bonding components in the automotive and aircraft industries although the adhesive have uses in other industries. Activatable structural adhesives are known from, for example WO 2009/124709. The adhesives are typically pastes or liquids to enable then to be dispensed between two items to be bonded such as metal panels that are to be welded together.

There are however applications, where it would be beneficial to have a structural adhesive that is dry and can be moulded at temperatures below that at which it cures so that it has a definable shape prior to curing.

Additionally it would be useful to have m adhesive that can replace welding and particularly be useful for bonding together dissimilar materials with a bond of adequate strength. The present invention relates to the provision of an improved structural adhesive, and articles incorporating the same. The structural adhesive assists in providing various properties, including structural reinforcement, adhesion, sealing, acoustical damping properties, thermal insulation or a combination thereof within a cavity of, or upon a surface of a structure, or to one or more structural members (e.g., a body panel or structural member) of an article of manufacture (e.g., an automotive vehicle or an aircraft) such as within a weld flange (the intended applications would not necessarily be in weld flanges. As used herein, the phrase structural adhesive includes any material that may be activated to cure and develop adhesive properties (e.g., thermoset), and optional melt, flow, expand, foam or a combination thereof. The material will cure and may in addition expand, foam, flow, melt, a combination thereof or the like upon exposure to a condition such a heat, pressure, chemical exposure, atmospheric moisture and combinations thereof.

Activatable structural adhesives are used in weld seams and weld flanges in automotive vehicles and are also used in hem flanges. In some instances a continuous band of structural adhesive is provided to supplement the strength of sections that have been spot welded. Welding is a time consuming and expensive process and in a typical automotive assembly line several hundreds of spot welds may be required. Furthermore, it is sometimes not possible to weld dissimilar materials such as steel and aluminium and it is also not possible to weld certain polymers and polymer composites. There is therefore an incentive not only to increase the strength of the welded segment but also to reduce the number of welds that are required in any particular location. In particular there is a need to bond together dissimilar materials with a bond of adequate strength.

Structural adhesives are also used to improve the stiffness of automobiles so reducing the likelihood of vehicle roll over, improving vehicle ride characteristics and increasing vehicle durability and fatigue life.

The structural adhesive of the present invention may be applied to various articles of manufacture for adding structural integrity to portions or members of articles or for sealing the articles. Examples of such articles of manufacture include, without limitation, household or industrial appliances, furniture, storage containers, buildings, structures or the like. In preferred embodiments, a structural adhesive is used for bonding portions of an automotive vehicle or aircraft such as body or frame members (e.g., a vehicle frame rail) of the automotive vehicle.

The present invention therefore provides a structural adhesive that is solid and dry to the touch at ambient temperature, that can be activated to develop adhesive properties at an elevated temperature and which can be moulded (to create either a flat piece, or a three dimensional complex shape) without curing at a temperature between ambient and the elevated temperature.

The structural adhesive preferably comprises a high molecular weight resin, an impact modifier and a curing agent for the resin. The preferred resin is a high molecular weight epoxy resin such as a bisphenol A based solid epoxy resin, EPN or ECN epoxy resin or an adduct of an epoxy resin and a solid carboxyl terminated rubber such as a solid carboxyl terminated nitrile rubber. The impact modifier could be a core shell polymer or a modified rubber such as a rubber modified epoxy.

The structural adhesive may contain other components and is formulated to produce the solid and dry to the touch at ambient temperature material of the invention. For example the dry material may be created by the use of a filler particularly high surface area filler, the reduction or elimination of liquid ingredients and the inclusion of elastomeric and/or thermoplastic materials.

In one embodiment the material of the present invention may be an expandable material although unexpandable materials. Where the material is expandable the material may expand (e.g., foam to a volume greater than its volume in the unexpended state (e.g., at least 5% greater, at least 50% greater, at least 200% greater). It is also typically preferred at least for reinforcement applications that the volumetric expansion is such that the expanded volume is less than 400%, more typically less than 300%, even more typically less than 200% and possibly less than 100% relative to the original unexpended volume. It is also contemplated that the volume of the material may be less after activation due to curing (e.g., cross-linking) for foamed or unfoamed versions of the activatable material.

The performance required of a structural adhesive is good Lap Shear, high T Peel and good performance in the Wedge Impact Test over the range of temperatures and environmental conditions to which the adhesive may be subjected. Other desirable properties include good adhesion durability under various types of exposure conditions such as high humidity, salt water and high and low temperatures with maintenance of the physical properties over time. In certain applications a high elastic modulus, a high Tg, high strain to failure and other physical properties may be desired. The structural adhesives of this invention can have an elastic modulus typically greater then 1 GPa and a lap shear strength typically greater than 10 MPa when tested using a 0.3 mm thickness bondline for example.

Materials that may be used in the structural adhesives of this invention are discussed below.

The epoxy elastomer adduct may be used to import flexibility to the structural adhesive and the ability to initiate plastic deformation. Various epoxy/elastomer adducts may be employed in the present invention. The epoxy/elastomer hybrid or adduct may be included in an amount of up to about 50% by weight of the structural adhesive. The epoxy elastomer adduct is approximately at least 5%, more typically at least 7% and even more typically at least 10% by weight of the activatable material and more preferably about 5% to 20% by weight of the adduct based on the structural adhesive. The elastomer-containing adduct may be a combination of two or more particular adducts and the adducts may be solid adducts, semi-solids, at a temperature of 23° C. or may also be combinations thereof. A solid adduct is preferred in one preferred embodiment the adduct is composed of substantially entirely (i.e., at least 70%, 80%, 90% or more) of one or more adducts that are solid at a temperature of 23° C. We have found unexpectedly that when the adduct is used together with a core/shell polymer and a phenoxy resin desirable adhesive performance can be achieved over a wide range of temperatures employing a relatively small amount of the adduct. This lower amount of adduct such as 5% to 15% by weight imparts high temperature stability to the structural adhesive since there is little undesirable lowering of the Tg of the formulation.

The adduct itself generally includes about 1:5 to 5:1 parts of epoxy to elastomer, and more preferably about 1:3 to 3:1 parts of epoxy to elastomer. More typically, the adduct includes at least about 10%, more typically at least about 20% and even more typically at least about 40% elastomer and also typically includes not greater than about 60%, although higher or lower percentages are possible. The elastomer compound suitable for the adduct may be a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrite rubber (e.g., a butyl nitrite, such as carboxy-terminated butyl nitrite), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of additional or alternative epoxy/elastomer or other adducts suitable for use in the present invention are disclosed in United States Patent Publication 2004/0204551.

The elastomer-obtaining adduct is included to modify structural properties of the structural adhesive such as strength, toughness, stiffness, flexural modulus, and the like. Additionally, the elastomer-containing adduct may be selected to render the activatable material more compatible with coatings such as water-borne paint or primer system or other conventional coatings.

A phenoxy resin may be used as the high molecular weight resin. Phenoxy resins are high molecular weight thermoplastic condensation products of bisphenol A and epichloro-hydrin and their derivatives. Typically the phenoxy resins that may be employed are of the basic formula

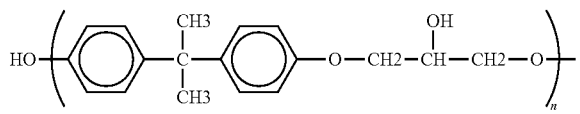

where n is typically from 30 to 100 preferably from 50 to 90. Modified phenoxy resins may also be used. Examples of phenoxy resins that may be used are the products marketed by Inchem Corp. Examples of suitable materials are the PKHB, PKHC, PKHH, PKHJ, PKHP pellets and powder. Alternatively phenoxy/polyester hybrids and epoxy/phenoxy hybrids may be used. In order to enhance the production of the structural adhesive the phenoxy resin may be supplied to the other components as a solution. While any solvent may be used it is particularly preferred to use a liquid epoxy resin as the solvent as this can also contribute to the adhesive properties upon activation. We prefer to use more than 30% by weight of the phenoxy resin based on the weight of the structural adhesive.

A core/shell polymer may be used as the impact modifier. As used herein, the term core/shell polymer denotes a polymeric material wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. The core/shell polymer should be compatible with the other components of the formulation and preferably has a ductile core and a rigid shell which is compatible with the other components of the structural adhesive formulation.

The first and second polymeric materials of the core/shell polymer can include elastomers, polymers, thermoplastics, copolymers, other components, combinations thereof or the like. In preferred embodiments, the first polymeric material, the second polymeric material or both include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Preferred core/shell polymers are formed by emulsion polymerization followed by coagulation or spray drying. It is also preferred for the core/shell polymer to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core-shell graft copolymers are those where hard containing compounds, such as styrene, acrylonitrile or methyl methacrylate, are grafted onto a core made from polymers of soft or elastomeric compounds such as butadiene or butyl acrylate. U.S. Pat. No. 3,985,703, describes useful core-shell polymers, the cores of which are made from butyl acrylate but can be based on ethyl isobutyl, 2-ethylhexyl or other alkyl acrylates or mixtures thereof. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion is preferably polymerized from methyl acrylates such as methyl methacrylate and optionally other alkyl acrylates and methacrylates, such as ethyl, butyl, or mixtures thereof acrylates or methacrylates as these materials are compatible with the phenoxy resin and any epoxy resins that are used in the formulation. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984,497; 4,098,202; 4,034,013; 3,944,631; 4,308,040; 4,495,324; 4,304,709; and 4,536,436. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

Examples of useful core/shell polymers include, but are not limited to those sold under the tradename, PARALOID, commercially available from Rohm & Haas Co. One particularly preferred grade of PARALOID impact modifier has a polymethyl methacrylate shell and an MBS core modifier and is sold under the designation EXL-2650; the product E-950 solid by Akema may also be used with equal effectiveness. We prefer to use from 5% to 30% of the core shell polymer.

One or more curing agents are included in the structural adhesive of this invention. The curing agent will cause the high molecular weight resin to cure (set) at elevated temperature. Optionally curing agent accelerators may also be included. The amounts of curing agents and curing agent accelerators used can vary widely depending upon the type of structure desired, the desired properties of the structural adhesive and in the embodiment when the material is expandable the desired amount of expansion of the activatable material and the desired rate of expansion. Exemplary ranges for the curing agents or curing agent accelerators present in the structural adhesive range from about 0.001% by weight to about 7% by weight.

Preferably, the curing agents assist the activatable material in curing by crosslinking of the polymers, phenoxy epoxy resins or both and any epoxy resin that may be present. It is also preferable for the curing agents to assist in thermosetting the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. If an accelerator for the curing agent is used examples of materials includes a modified or unmodified urea such as methylene diphenyl bis urea, an imidazole or a combination thereof.

The high molecular weight resin may also be or include an epoxy resin. Epoxy resin is used herein to mean any of the conventional dimeric, oligomeric or polymeric epoxy materials containing at least one epoxy functional group. Important current epoxy content is more than 40%. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the activatable material includes between about 2% and 75% by weight epoxy resin, more preferably between about 4% and 60% by weight epoxy resin and even more preferably between about 25% and 50% by weight epoxy resin. Of course, amounts of epoxy resin may be greater or lower depending upon the intended application of the structural adhesive.

The epoxy resin may be aliphatic, cycloaliphatic, aromatic or the like. The epoxy may be supplied as a solid (e.g., as pellets, chunks, pieces or the like) or a liquid (e.g., an epoxy resin) although solid resins are preferred for the preparation of dry structural bonding materials. A liquid resin can sometimes be employed as a solvent for another component of the formulation such as a phenoxy resin (or to increase the crosslink density of the formulation). As used herein, unless otherwise stated, a resin is a solid resin if it is solid at a temperature of 23° C. and is a liquid resin if it is a liquid at 23° C. The epoxy may include an ethylene copolymer or terpolymer. As a copolymer or terpolymer, the polymer is composed of two or three different monomers, i.e., small molecules with high chemical reactivity that are capable of reacting with similar molecules.

An epoxy resin may be added to the activatable material to increase the adhesion, flow properties, strength or stiffness of the material. One exemplary epoxy resin may be a phenolic resin, which may be a novolac type or other type resin. Other preferred epoxy containing materials may include a bisphenol-A epichlorohydrin ether polymer, or a bisphenol-A epoxy resin which may be modified with butadiene or another polymeric additive or bisphenol-F-type epoxy resins. Moreover, various mixtures of several different epoxy resins may be employed as well. Examples of suitable epoxy resins are sold under the tradename Araldite GY 282, GY 281 and GY 285 supplied by Huntsman.

The compositions of this invention may contain other ingredients such as one or more of the following
i) Polymers;
ii) Blowing Agent;
iii) Filler;
iv) Flow Control Materials and
v) Nano Particles.
vi) Pigments
vii) Flame Retardants
viii) Fibers
ix) Moisture Scavengers Polymer or Copolymer Depending upon the use to which the structural adhesive is to be put, it may include one or more additional polymers or copolymers which may or may not contain functional groups, which can include a variety of different polymers, such as thermoplastics, elastomers, plastomers and combinations thereof or the like. For example, and without limitation, polymers that might be appropriately incorporated into the structural adhesive include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g. ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, polyvinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprise a small portion or a more substantial portion of the material. When used, the one or more additional polymers preferably comprises about 0.1% to about 50%, more preferably about 1% to about 20% and even more preferably about 2% to about 10% by weight of the activatable material.

In certain embodiments, it may be desirable to include one or more thermoplastic polyethers and/or thermoplastic epoxy resins in the structural adhesive. When included, the one or more thermoplastic polyethers preferably comprise between about 1% and about 90% by weight of the structural adhesive, more preferably between about 3% and about 60% by weight of the structural adhesive and even more preferably between about 4% and about 25% by weight of the structural adhesive. As with the other materials, however, more or less thermoplastic polyether may be employed depending upon the intended use of the structural adhesive.

The thermoplastic polyethers typically include pendant hydroxyl moieties. The thermoplastic polyethers may also include aromatic ether/amine repeating units in their backbones. The thermoplastic polyethers preferably have a melt index between about 5 and about 100, more preferably between about 25 and about 75 and even more preferably between about 40 and about 50 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,278,853; 5,484,924 and 5,982,083. Advantageously, the thermoplastic polyethers can provide the structural adhesive with various desirable characteristics such as desirable physical and chemical properties for a wide variety of applications as is further described herein.

Although not required, the formulation may include one or more ethylene polymers or copolymers such as ethylene acryllate copolymers, ethylene vinyl acetate copolymers. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

Blowing Agent

The invention envisages both non-expandable and expandable structural adhesives although non-expandable materials are more typical if the activatable material is expandable one or more blowing agents may be added for producing inert gasses that form, as desired, an open and/or closed cellular structure within the activatable material. In this manner, it may be possible to lower the density of articles fabricated by using the structural adhesive. In addition, the material expansion can help to improve sealing capability, acoustic damping and particularly adhesion to bonding substrate.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4-oxy-bis-(benzenesulphonylhydrazide), trihydrazinotriazine and N,N-dimethyl-N,N-dinitrosoterephthalamide. An accelerator for the blowing agents may also be provided. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles (ureas).

Another class of blowing agents are physical blowing agents such as Expancel products marketed by Akzo-Nobel. These blowing agents consist of a polymeric particle with a volatile liquid in the center. As the temperature is increased, the polymer shell softens and the gas inside the particle causes the polymer particle to expand, in this way, a foamed product is produced.

The amounts of blowing agents and blowing agent accelerators that are used can vary widely depending upon the type of cellular structure desired, the desired amount of expansion of the structural adhesive, the desired rate of expansion and the like. Exemplary ranges for the amounts of blowing agents and blowing agent accelerators in the activatable material range from about 0.001% by weight to about 5% by weight and are preferably in the structural adhesive in fractions of weight percentages.

Filler

The structural adhesive may also include one or more fillers, including but not limited to particulate materials (e.g., powder), beads, microspheres such as Zeospheres available from Zeelan Industries, or the like. Preferably the filler includes a material that is generally non-reactive with the other components present in the structural adhesive however, the surfaces may be treated to improve adhesion or compatibility with the adhesive matrix. While the fillers may generally be present within the structural adhesive to take up space at a relatively low weight and cost, it is contemplated that the fillers may also impart properties such as strength and impact resistance to the structural adhesive.

Examples of fillers that may be used include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the activatable material can range from 10% or less to 70% or greater by weight of the structural adhesive. According to some embodiments, the structural adhesive may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other Components and Additives

It is contemplated that most nearly any additional chemicals, materials or otherwise may be added to the structural adhesive assuming they are suitable for the chosen application of the structural adhesive.

Other additives, agents or performance modifiers may also be included as desired, including but not limited to an antioxidant, a UV resistant agent, a flame retardant a heat stabilizer, a colorant, a processing aid, a lubricant, a reinforcement (e.g., chopped or continuous glass, ceramic, aramid, or carbon fiber, particulates or the like). Liquid polysulfides particularly epoxidized may be used to improve the environmental exposure of the adhesive such as exposure to humidity and salt water.

When determining appropriate components for the activatable material, it may be important to form the material such that it will only activate (e.g., flow, foam or otherwise change states) at appropriate times or temperatures. For instance, it is undesirable tor the material to be reactive at ambient temperature in a(n) assembly environment. More typically, the structural adhesive becomes activated at higher processing temperatures. As an example, temperatures such as those encountered in an automobile assembly plant may be appropriate, especially when the structural adhesive is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher.

The relative proportions of the materials that should be used will depend upon the use envisaged for the activatable material. We prefer however to use from 40% to 75% of the high molecular weight resin, from 10% to 25% of an impact modifier and from 0.5 to 10% of the curing agent. Preferred amounts of the other optional ingredients are as follows: 5% to 75% of one or more epoxy resins, preferably a liquid epoxy resin, 0.2% to 3% of a cure accelerator, 0.1% to 50% mineral filler, 0.1% to 3.0% clay and/or silica.

Formation and Application of the Structural Adhesive

Formation of the structural adhesive can be accomplished according to a variety of new or known techniques. According to one embodiment, the structural adhesive is formed by supplying the high molecular weight resin and the impact modifier in solid form such as pellets, chunks and the like and melt blending with the curing agent at a temperature below that at which the curing agent is activated. Alternatively, if a phenoxy resin is used a solution of the phenoxy resin in a liquid epoxy resin may be used and blended with a core/shell polymer, the fillers may then be added and finally the curing agent and optionally any curing agent accelerator are added and mixed, preferably under vacuum to remove any entrapped air. The components are typically combined in one or more blenders such as large bins or other containers. Preferably, the containers can be used to intermix the components by rotating or otherwise moving the container. Thereafter, heat, pressure or a combination thereof may be applied to soften or liquidize the solid components such that the components can be intermixed by stirring or otherwise into a single homogenous composition. The heat and pressure may then be relaxed to yield the solid dry structural adhesive of the invention. This may then be pelletized and these pellets can be processed further to form a molded structural adhesive material.

It is important to assure that the temperature of the components remains below the curing temperature once the curing agents have been added. Additionally, when the activatable material contains a blowing agent, it is typically desirable to maintain the temperature of the structural adhesive below a temperature that will activate the blowing agent during formation of the structural adhesive.

In use the structural adhesive of the present invention is typically moulded to produce a moulding of the required shape. The moulding may then be laid up with the components that are to be bonded together and activated to cure the structural adhesive. Activation may be accomplished in a paint oven. The adhesive is formulated to be activated at the desired temperature. In automobile manufacture where activation typically occurs at elevated temperatures in the range 140° C. to 200° C. The time required depending upon the temperature employed with 30 minutes being typical. Activation of the material may also include at least some degree of foaming or bubbling in situations where the activatable material includes a blowing agent. Such foaming or bubbling can assist the structural adhesive in wetting a substrate and forming an intimate bond with the substrate. The structural adhesive may be extruded in place at the location where it is to perform. The adhesive is particularly suitable for moulding into any required shape and pre assembled with the materials to be bonded together and the adhesive activated by heating to the curing temperature so that it bonds the materials together.

Depending upon the intended application, the structural adhesive may be applied and activated in different ways and at different times. The material may be formed into a strip and applied by hand or mechanically to wherever it is to be used. The material may be extruded onto the position where it is used. Thus, exemplary uses of the structural adhesive are discussed below to illustrate preferred methodologies of application and activation of the activatable material. In particular, the structural adhesive may be used for, amongst others, reinforcement, sealing and adhering or the like.

Reinforcement

The structural adhesive may be used to reinforce structural members of an article of manufacture. When used for reinforcement, the structural adhesive may be employed by itself, it may be employed in conjunction with other materials (e.g., a backing), may be applied to a carrier member or the like. The structural adhesive is particularly useful to provide added strength to metal welds such as weld flanges and may be applied between pieces of metal that are subsequently welded together. In a preferred use the material is used to bond metal components together replacing the need for welds.

According to one embodiment, the structural adhesive of the present invention is applied to a carrier member to form a reinforcement member and the reinforcement member is inserted within a cavity formed by a structural member of an automotive vehicle. The structural member of the automotive vehicle may be nearly any member of the vehicle including, but not limited to, frame members, body member, pillar structures, closure panels, roof assemblies, bumpers, combinations thereof or the like.

The carrier member may be selected from a variety of conventional and novel configurations. The structural adhesive of the present invention may thus be applied to a carrier member, such as a molded, extruded or stamped member (e.g., metal or plastic, foamed or unfoamed; exemplary materials of which include aluminum, magnesium, titanium, steel, molding compound (e.g., sheet or bulk molding compound), polyamide (e.g., nylon 6 or nylon 6,6), polysulfone, thermoplastic imide, polyether imide, polyether sulfone or mixtures thereof.

The materials of the present invention have been found to be effective structural adhesives which have desirable performance over an extended temperature range particularly in the Wedge Impact Test. The materials have been found to maintain their adhesive properties over an extended period of time and to be effective in humid or salt spray environments. They are useful for structural bonding in a variety of applications such as the automotive, aircraft, aerospace, railroad vehicles, trucks, busses, sports goods, construction and furniture industries. They have been found to be particularly useful in reinforcing welded areas and in some instances to avoid the need to weld in areas that have hitherto been welded.

The present invention is illustrated by reference to the following examples.

The lap shear test is a modification of ASTM D-1002 and involves taking two coupons, providing a moulding of the adhesive in between the metal coupons and curing the material. The bondline is the thickness of the material (following the curing process). The overlap area of the two pieces of metal in this case is 12.5 mm×25 mm. The metal coupons are gripped in a mechanical testing machine and pulled apart. The maximum stress is measured by dividing the peak load by the overlap area.

The T-peel test is a modification of ASTM D-1876 in which two coupons are bent to an L-shape. Uncured adhesive is provided onto the long part of the coupon. The two metal coupons are put together to make a T-shape. The metal coupons are cured to create a T-shaped test specimen. The bondline is the thickness of the cured material. The overlap area with adhesive is 25 mm by 100 mm. The two legs of the T-shape are put into testing grips in a mechanical testing machine and pulled apart. The average force per material width is calculated from this test.

The tensile strain to failure was measured by performing a tensile test (ISO 527 for example) while using an extensometer to record the deformation that is then used to calculate the material strain.

EXAMPLE 1

The following formulation was prepared
Phenoxy Dissolution Product (70% phenoxy PKHJ, 30% Epalloy 8220 Bisphenol F epoxy resin)—175 grams
Araldite 1522 ES Solid Epoxy Adduct—50 grams
Paraloid EXL 2650 Core/Shell Material—50 grams
Amicure CG-1200 Dicyanamide—20 grams
Twaron 1099—Aramid fiber pulp—3 grams
Cellcom AC 7000 DB—1 gram The formulation was solid and dry to the touch at ambient temperature and could be moulded without curing at an elevated temperature.
Expansion (40 minutes, 180 C)—39%
Lap Shear*—22 MPa
T-Peel—8.5 N/mm
Tensile Strain to Failure: 6.5%

*1.8 mm thick 12.5 mm overlap, 0.3 mm bondline

EXAMPLE 2

The following formulation was prepared
Phenoxy Dissolution Product (70% phenoxy PKHJ, 30% Epalloy 8220 Bisphenol F Epoxy Resin)—175 grams
Araldite 1522 ES Solid Epoxy Adduct—50 grams
Paraloid EXL 2650 Core/Shell Material—50 grams
Amicure CG-1200 Dicyanamide—20 grams
Twaron 1099—Aramid Fiber Pulp—3 grams
Cellcom AC 7000 DB—1 gram
Nanopox A-510—30 grams The formulation was solid and dry to the touch at ambient temperature and could be moulded without curing at an elevated temperature
Expansion (40 minutes, 180 C)—56%
Lap Shear—20 MPa

EXAMPLE 3

Phenoxy Dissolution Product (70% phenoxy PKHJ, 30% Epalloy 8220 Bisphenol F epoxy resin)—150 grams
Araldite 1522 ES Solid Epoxy Adduct—75 grams
Paraloid EXL 2650 Core/Shell Material—50 grams
Amicure CG-1200 Dicyanamide—20 grams
Lap Shear—31 MPa

EXAMPLE 4

The following formulation was prepared
Phenoxy dissolution product (70% phenoxy PKHJ, 30% Epalloy 8220 Bisphenol F epoxy resin)—175 grams
Solid Rubber Adduct 1*—50 grams
Paraloid EXL 2650—50 grams
Amicure CG-1200 Dicyanamide—20 grams

*Prepared by reacting 250 grams of Nipol 1072 CGX with 30 grams of Cardolite NC2513HP liquid epoxy diluent followed by a reaction with 280 grams of Araldite 7072 solid epoxy resin. Pre-reaction is necessary to reduce carboxylation to prevent cross-linking during adduction reaction.

The formulation was solid and dry to the touch at ambient temperature and could be moulded without curing at an elevated temperature.
Lap Shear—32 MPa
T-Peel—8 N/mm
Strain to Failure 12%

EXAMPLE 5

The following formulation was prepared
Phenoxy Dissolution Product (70% phenoxy PKHJ, 30% Epalloy 8220 Bisphenol F epoxy resin)—175 grams
Solid Rudder Adduct 1—50 grams
Amicure CG-1200 Dicyanamide—12 grams
Lap Shear: 34 MPa The formulation was solid and dry to the touch at ambient temperature and could be moulded without curing at an elevated temperature.

The invention claimed is:

1. A process for bonding comprising:
   applying a heat activated structural adhesive to a substrate at a temperature below an activation temperature of a curing agent of the heat activated structural adhesive, wherein the heat activated structural adhesive is solid and dry to the touch at ambient temperature;
   wherein the heat activated structural adhesive comprises:
   a phenoxy resin;
   an impact modifier comprising a core shell polymer or modified rubber;
   the curing agent; and
   an epoxy/elastomer adduct;
   wherein the heat activated structural adhesive is activated to develop adhesive properties at an elevated temperature and is molded at a temperature below the activation temperature of the curing agent without curing by forming at a temperature between ambient and the elevated temperature;
   wherein the heat activated structural adhesive has an elastic modulus of about 1 GPa or greater and a lap shear strength of about 10 MPa or greater; and
   placing a second substrate against the structural adhesive and raising the temperature to above the activation temperature of the curing agent.

2. A process according to claim 1 in which both substrates are metal components.

3. A process according to claim 1, wherein the structural adhesive is formed as a planar piece prior to curing.

4. A process according to claim 1, wherein the structural adhesive is formed as a three dimensional shape prior to curing.

5. A process according to claim 1, wherein the structural adhesive is molded to a desired shape prior to applying the structural adhesive to the substrate.

6. A process according to clan 1, wherein the structural adhesive adheres to the substrate prior to curing.

7. A process according to claim 1 including providing the phenoxy resin as a liquid and blending the liquid with a core shell polymer.

8. A process according to claim 1 including extruding the structural adhesive.

9. A process according to claim 1 including mechanically or adhesively attaching the structural adhesive to one or more of the substrate and second substrate.

10. A process according to claim 1, wherein the impact modifier is a core shell polymer, and wherein greater than 30% by weight of the core shell polymer comprises a first polymeric material encapsulated by a second polymeric material.

11. A process according to claim 10, wherein the first polymeric material, the second polymeric material, or both, comprise at least 70% by weight of one or ore thermoplastics.

12. A process according to claim 1, where the epoxy/elastomer adduct is provided in an amount up to about 50% by weight of the structural adhesive.

13. A process according to claim 12, wherein the epoxy/elastomer adduct is provided in an amount between about 5% and about 15% by weight.

14. A process according to claim 1, wherein the epoxy/elastomer adduct comprises at least about 10% elastomer.

15. A process according to claim 2 wherein the epoxy/elastomer adduct comprises at least about 20% elastomer.

16. A process according to claim 15, wherein the epoxy/elastomer adduct comprises at least about 40% elastomer.

17. A process according to 14, wherein the epoxy/elastomer adduct comprises 60% elastomer or less.

18. A process according to claim 1, wherein the heat activated structural adhesive further comprises a curing agent accelerator, a blowing agent, a blowing agent accelerator, or a combination thereof.

19. A process according to claim 18, wherein the curing agent accelerator is present in the structural adhesive in an amount of from about 0.001% by weight to about 7% by weight, and the blowing agent and/or accelerator is present in the structural adhesive in an amount of about 0.001% by weight to about 5% by weight.

20. A process according to claim 1, wherein the curing agent is present in the structural adhesive in an amount of from about 0.001% by weight to about 7% by weight.

* * * * *